May 12, 1942.  V. E. CARBONARA  2,283,045
PITOT STATIC TUBE
Filed Feb. 9, 1937  2 Sheets-Sheet 1
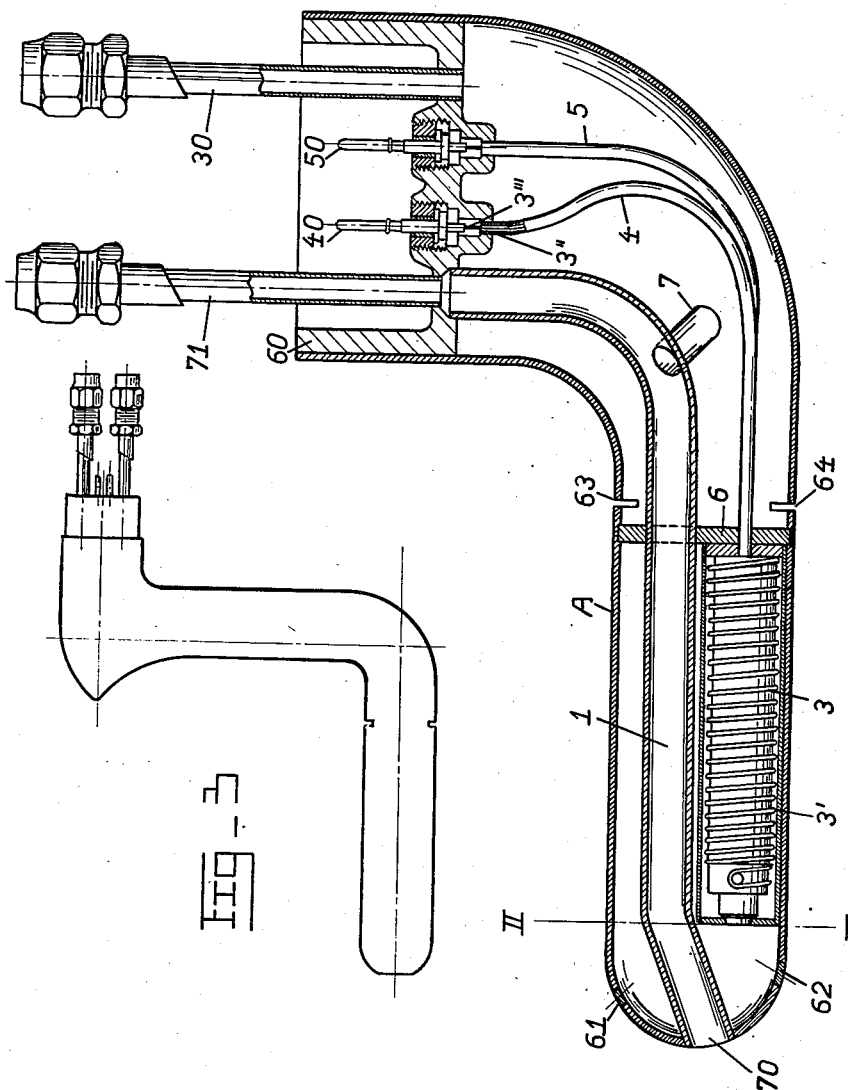
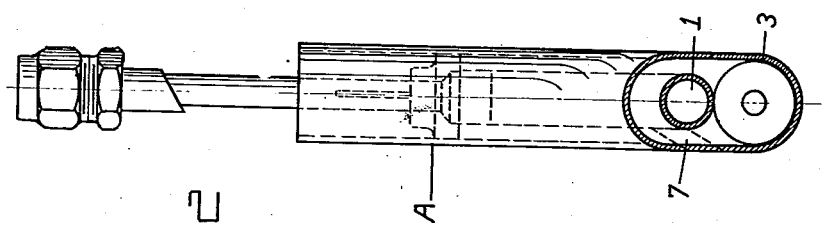
INVENTOR
VICTOR E. CARBONARA
BY
ATTORNEY

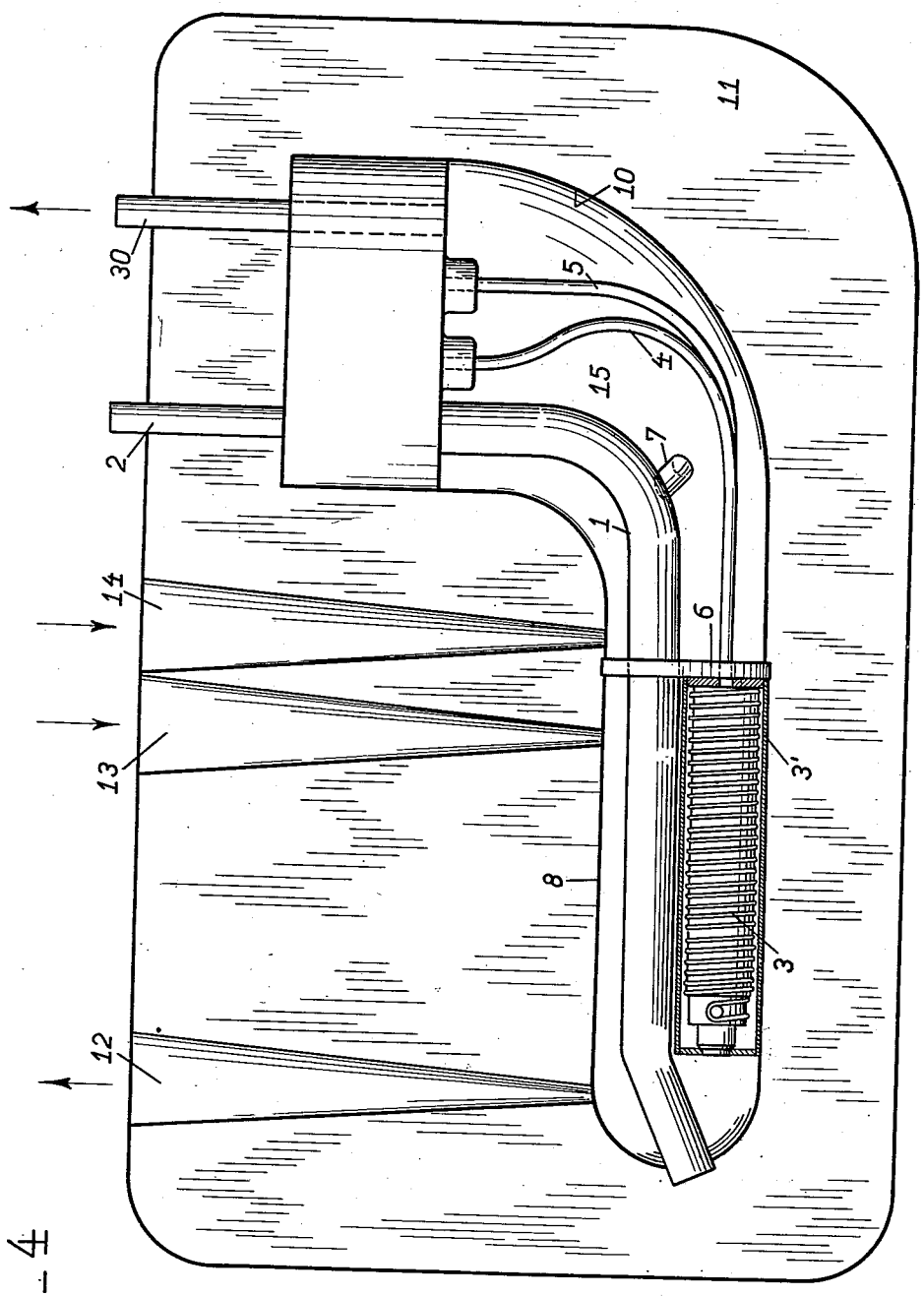

Patented May 12, 1942

2,283,045

UNITED STATES PATENT OFFICE 2,283,045

PITOT STATIC TUBE

Victor E. Carbonara, Rockville Centre, N. Y., assignor, by mesne assignments, to Square D Company, Detroit, Mich., a corporation of Michigan Application February 9, 1937, Serial No. 124,839

12 Claims. (Cl. 73—212)

The invention relates to Pitot static tubes. The object of the invention is to provide a more efficient method for the manufacture of such tubes and to produce an improved tube itself.

In general the method contemplates the assembling of all the internal and outleading parts arranging them in a desired relationship; confining them in a removable mould and moulding a body of solidifiable meltable substance about the internal parts; causing it to solidify and causing its surface to be electrically conductive; the electroplating of this assemblage with an outer metallic shell about the parts; and removing the moulded substance by the application of heat and venting.

The improved Pitot static tube itself may have practically all the desired internal parts anchored relatively to each other and have a completely continuous unbroken outer shell which may be stream-lined exactly as may be desired.

Further objects of the invention will be pointed out more particularly in the following claims which are directed to illustrative embodiments of the invention for purposes of illustration.

In the drawings Fig. 1 is a longitudinal vertical section showing a preferred form of the finished Pitot static tube;

Fig. 2 is a vertical cross-section taken along the plane of II—II of Fig. 1;

Fig. 3 is a side elevation showing a modified form of the Pitot static tube;

And Fig. 4 is a diagrammatic view corresponding to Fig. 1 showing the removable mould and assemblage for moulding.

All the desired internal and outleading parts are first shaped and relatively assembled as desired for the finished Pitot static tube. In Fig. 4 one assemblage of these parts is shown including the dynamic duct 1 exteriorly terminating in the outlead duct 2; the static outlet duct 30; the heater 3; the electrical leads 4 and 5; the assembly frame 6; the bleeder duct 7; and the outleading electrical terminals in general similar to terminals 40 and 50, as shown in Fig. 1.

The heater 3 comprises any suitable resistance winding connectable in a heater circuit through leads 4 and 5. A cylindrical metallic shell or capsule 3', preferably copper, is closed at the ends to complete an hermetical enclosure for the heater unit and its leads, which are enclosed in metallic cases 3" insulated from the wires 3'" but welded or soldered into shell or capsule 3' and mount or supporting member 60. Thus none of the heater coil or its electrical connections are exposed to moisture in the Pitot static tube.

These parts thus assembled are confined within the moulding chamber 10 of a removable mould 11 which is shown with appropriate sprue holes 12, 13 and 14, although 12 is usually used as a vent while the outleading static duct 30 may serve as a vent for the chamber portion 15.

Preferably an easily meltable metal substance such as Wood's metal, lead bismuth or other fusible alloy is melted and poured into the mould 11 about the parts shown in Fig. 4. The moulded substance is cooled and the moulded assemblage is removed from the mould, carried to an electroplating bath and has deposited about its surface a shell of electrodeposited metal, preferably copper. Any exposed parts not desired to be plated such as the inside and the cupped parts of the mount 60 and its outleading parts may be protected by a non-conducting coating and/or filling of paraffin or the like. It should be noted that the partition 6 is preferably slightly larger than the general diameter of the tube portion 8. This is for the purpose of effecting a mechanical interlocking between the electro-deposited shell A and itself. It is preferred that all parts adapted to contact with the shell A be formed of the same metal as that which is electro-deposited or of a metal which adheres thereto by electrolytic depositing. This applies to the mounting frame or supporting member 60, to the dynamic duct 1, to the bleeder duct 7 and to the metallic shell or capsule 3' for the heater 3. Instead of using a meltable metallic substance, the solidifying of which causing its surface as well as its interior to become electrically conducting, the meltable solidifiable substance may be any suitable substance even wax, such as paraffin which after solidification may have its surface coated with graphite to render it conducting for the plating on of the shell.

Dynamic duct 1 preferably extends out into the mould, as shown in Fig. 4, a little. For a finished structure this may be machined off after the shell A is completed. After the completion of the one piece external shell A by electro-deposition it is convenient to provide vents 61 and 62 and the static ports 63 and 64. Heating of the shell A then makes it easy to expel the internal meltable material by forcing air or gas into one of the vents and into the outleading duct 30 forcibly to expel the melted mouldable material through other vents. The permanently undesired vents may be closed off after this operation.

Any desired construction for the mount 60 may be imparted to the Pitot static tube. The form shown in Fig. 1 mounts fore and aft on the lower end of a downwardly extending strut while that shown in Fig. 3 mounts on the forward end of a fore and aft strut.

In this manner a Pitot static tube is produced, the elements of which form integral homogeneous parts of a one-piece metallic structure which is extremely resistant to corrosion. This resistance is achieved by the elimination of additional metals used, for example, for soldering or brazing the parts together and which, if exposed to atmospheric moisture, will form a battery causing destruction at the parts where the different metals are joined together.

Furthermore, the one-piece metallic structure provides a low-resistance passage for heat from the heater member to all parts of the Pitot static tube.

In order to facilitate the drainage of water entering the duct 1, the forward end thereto may be downwardly inclined as shown in the drawings. A bleeder duct 7, of much smaller diameter than the aperture 10 of the duct 1 further permits water to drain out practically without affecting the magnitude of the dynamic pressure set up in the tube 1. This pressure is a function of the rate at which air is moving relatively to the Pitot static tube.

Obviously, the present invention is not limited to the particular forms herein shown and described but may be utilized with equal advantage for making other forms of tubes than the ones shown.

What is claimed is:

1. The method of constructing a Pitot static tube comprising arranging the internal and outleading parts of said tube in relative positions desirable for the finished structure; enclosing said parts in a removable hollow mould; moulding a melted solidifiable substance about said parts within said mould and causing the surface of said moulded material to be an electrically conducting surface and to assume substantially the finished surface contour of said Pitot static tube; electro-depositing a metal about said conducting surface and effecting a self-sustaining combination with said parts; and removing said moulded material by heating and venting.

2. That method of making a Pitot static tube which comprises arranging the internal and outleading elements in such position relatively to each other as they are to assume in the finished structure; enclosing said elements in a cast core of fusible metal; electrolytically depositing on said core a coating of a metal having a higher melting point than the core metal; and removing said core by application of heat.

3. That method of making a Pitot static tube which comprises arranging the internal and outleading elements in such position as they are to assume in the finished structure; enclosing said elements in a cast core of fusible non-metallic material; rendering the surface of said core electrically conductive by applying a layer of conductive material to the same; electrolytically depositing on said layer a coating of metal having a higher melting point than the core material; and removing said core by application of heat.

4. That method of making a Pitot static tube which comprises arranging the internal and outleading elements in such position as they are to assume in the finished structure; enclosing said elements in a cast core of fusible non-metallic material; rendering the surface of said core electrically conductive by applying a layer of conductive material to the same; and electrolytically depositing on said layer a coating of metal having a higher melting point than the core material.

5. In the method of making a Pitot static tube the following steps: Enclosing a metallic tube within a core of fusible material with said tube protruding therefrom; electrolytically depositing on said core and the protruding part of the tube a coating of a metal having a higher melting point than the core material; and removing said core by application of heat, whereby a one-piece structure is produced.

6. In the method of making a Pitot static tube the following steps: Arranging a heater member enclosed in a metallic capsule, and a metallic tube in such position relatively to each other as they are to assume in the finished structure; enclosing said heater capsule and said tube in a core of fusible material in such manner that parts of said capsule and said tube remain exposed at the outer surface of said core; electrolytically depositing on said core and the exposed parts of said capsule and tube a coating of metal having a higher melting point than the core material; and removing said core by application of heat, whereby said capsule and tube are combined with said coating into a one-piece metallic structure.

7. That method of making a Pitot static tube which comprises preparing a mold having a cavity complementary to the form of the shell of the finished Pitot static tube but smaller corresponding to the thickness of the wall of the finished shell; arranging within said shell a supporting member and a dynamic conduit in such position relatively to each other as they are to assume in the finished tube; casting a core by filling said mold with an easily fusible substance; removing said mold; electrolytically depositing a shell on said core; and removing said core by application of heat.

8. A Pitot static tube comprising a conduit terminating in a dynamic pressure opening; and a shell forming a chamber enclosing at least part of said conduit and having a static pressure opening, said conduit as well as said shell constituting integral homogeneous electrolytically joined parts of a one-piece metallic structure.

9. A Pitot static tube comprising a conduit terminating in a dynamic pressure opening; a shell forming a chamber enclosing at least part of said conduit and having a static pressure opening; and a heater member enclosed in a metallic capsule inside said shell, said conduit, capsule, as well as shell constituting integral homogeneous electrolytically joined parts of a one-piece metallic structure, whereby a low-resistance passage is provided for heat from said heater to all parts of the Pitot static tube.

10. A Pitot static tube comprising a supporting member; a conduit extending from said supporting member and terminating in a dynamic pressure opening; a shell forming a chamber enclosing said conduit and extending from a part of said conduit adjoining the said opening to the said supporting member; a partition subdividing the chamber formed by said shell into a first and a second section, the first section being provided with a static pressure opening; and a heater member enclosed in a metallic capsule inside said second section, said supporting member, conduit, shell, partition, and capsule constituting integral homogeneous parts of an electrolytically joined one-piece metallic structure, providing a low-resistance passage for heat from said heater to all parts of the Pitot static tube.

11. A Pitot static tube comprising a supporting member; a conduit extending from said supporting member and terminating in a dynamic pressure opening; a shell forming a chamber enclosing said conduit and extending from a part of said conduit adjoining the said opening to the said supporting member, said shell being provided with a static pressure opening, said supporting member, conduit, and shell constituting integral homogeneous parts of an electrolytically joined one-piece metallic structure.

12. A Pitot static tube comprising a supporting member; a conduit extending from said supporting member and terminating in a dynamic pressure opening; a shell forming a chamber enclosing said conduit and extending from a part of said conduit adjoining the said opening to the said supporting member, said shell being provided with a static pressure opening; a heater member enclosed in a capsule and positioned inside said chamber; said supporting member, conduit, shell, and capsule constituting integral homogeneous parts of an electrolytically joined one-piece metallic structure providing a low-resistance passage for heat from said heater to all parts of the Pitot static tube.

VICTOR E. CARBONARA.